United States Patent
Xiao et al.

(10) Patent No.: US 9,059,451 B2
(45) Date of Patent: Jun. 16, 2015

(54) COATINGS FOR LITHIUM TITANATE TO SUPPRESS GAS GENERATION IN LITHIUM-ION BATTERIES AND METHODS FOR MAKING AND USE THEREOF

(71) Applicants: Xingcheng Xiao, Troy, MI (US); Mark W. Verbrugge, Troy, MI (US); John S. Wang, Los Angeles, CA (US); Ping Liu, Irvine, CA (US)

(72) Inventors: Xingcheng Xiao, Troy, MI (US); Mark W. Verbrugge, Troy, MI (US); John S. Wang, Los Angeles, CA (US); Ping Liu, Irvine, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/654,905

(22) Filed: Oct. 18, 2012

(65) Prior Publication Data
US 2014/0113197 A1   Apr. 24, 2014

(51) Int. Cl.
| | |
|---|---|
| H01M 4/131 | (2010.01) |
| H01M 4/139 | (2010.01) |
| H01M 4/485 | (2010.01) |
| H01M 10/42 | (2006.01) |
| H01M 10/52 | (2006.01) |

(52) U.S. Cl.
CPC .............. *H01M 4/131* (2013.01); *H01M 4/139* (2013.01); *H01M 4/485* (2013.01); *H01M 10/42* (2013.01); *H01M 10/52* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 6,451,487 B1 | 9/2002 | Besner et al. | |
| 7,018,607 B2 | 3/2006 | Nazri et al. | |
| 7,285,260 B2 | 10/2007 | Armand et al. | |
| 7,457,018 B2 | 11/2008 | Armand et al. | |
| 7,491,467 B2 | 2/2009 | Satoh et al. | |
| 7,651,732 B2 | 1/2010 | Cheng et al. | |
| 7,722,994 B2 | 5/2010 | Halalay | |
| 7,736,805 B2 | 6/2010 | Nazri et al. | |
| 8,101,152 B1 | 1/2012 | Halalay et al. | |
| 8,148,455 B2 | 4/2012 | Posudievsky et al. | |
| 8,247,116 B2 * | 8/2012 | He et al. | 429/247 |
| 8,309,644 B1 | 11/2012 | Huang | |
| 8,455,140 B1 | 6/2013 | Huang et al. | |
| 8,460,591 B2 | 6/2013 | Huang et al. | |
| 8,460,829 B1 | 6/2013 | Huang et al. | |
| 8,470,468 B2 | 6/2013 | Xiao et al. | |
| 8,470,898 B2 | 6/2013 | Huang | |

(Continued)

FOREIGN PATENT DOCUMENTS

| | | |
|---|---|---|
| CN | 103943819 A | 7/2014 |
| WO | 2014/022986 A1 | 2/2014 |

OTHER PUBLICATIONS

Aurbach, Doron, et al., "Design of electrolyte solutions for Li and Li-ion batteries: a review," Electrochimica Acta, vol. 50, pp. 247-254 (2004) (published online Aug. 3, 2004).

(Continued)

*Primary Examiner* — Sarah A Slifka
(74) *Attorney, Agent, or Firm* — Harness, Dickey & Pierce, P.L.C.

(57) ABSTRACT

An electroactive material for use in an electrochemical cell, like a lithium-ion battery, is provided. The electroactive material comprises lithium titanate oxide (LTO) and has a surface coating with a thickness of less than or equal to about 30 nm that suppresses formation of gases within the electrochemical cell. Methods for making such materials and using such materials to suppress gas formation in electrochemical cells are likewise provided.

15 Claims, 2 Drawing Sheets

(56) References Cited

U.S. PATENT DOCUMENTS

| | | |
|---|---|---|
| 2007/0238023 A1 | 10/2007 | Gorshkov et al. |
| 2008/0226987 A1 | 9/2008 | Yumoto et al. |
| 2008/0261116 A1 | 10/2008 | Burton et al. |
| 2009/0136415 A1 | 5/2009 | Gorshkov et al. |
| 2009/0140742 A1 | 6/2009 | Koch et al. |
| 2009/0253042 A1* | 10/2009 | Sun et al. ............ 429/231.95 |
| 2009/0325071 A1 | 12/2009 | Verbrugge et al. |
| 2010/0079145 A1 | 4/2010 | Meisner et al. |
| 2010/0143790 A1* | 6/2010 | Inagaki et al. ............... 429/163 |
| 2010/0272612 A1 | 10/2010 | Ramamurthy |
| 2011/0017528 A1 | 1/2011 | Kumar et al. |
| 2011/0044886 A1 | 2/2011 | Gorshkov et al. |
| 2011/0086249 A1 | 4/2011 | Timmons |
| 2011/0086294 A1 | 4/2011 | Xiao et al. |
| 2011/0111308 A1 | 5/2011 | Halalay et al. |
| 2011/0121225 A1 | 5/2011 | Posudievsky et al. |
| 2011/0151333 A1 | 6/2011 | Halalay et al. |
| 2011/0165459 A1 | 7/2011 | Halalay et al. |
| 2011/0166811 A1 | 7/2011 | Koch et al. |
| 2011/0189577 A1 | 8/2011 | Chung et al. |
| 2011/0200781 A1 | 8/2011 | Sowul et al. |
| 2011/0200863 A1 | 8/2011 | Xiao et al. |
| 2011/0224928 A1 | 9/2011 | Lin et al. |
| 2011/0250478 A1 | 10/2011 | Timmons et al. |
| 2012/0086457 A1 | 4/2012 | Meisner et al. |
| 2012/0100403 A1 | 4/2012 | Wang et al. |
| 2012/0101674 A1 | 4/2012 | Wang et al. |
| 2012/0105068 A1 | 5/2012 | Wang et al. |
| 2012/0105069 A1 | 5/2012 | Wang et al. |
| 2012/0109503 A1 | 5/2012 | Yang et al. |
| 2012/0156568 A1 | 6/2012 | Kia et al. |
| 2012/0156569 A1 | 6/2012 | Kia et al. |
| 2012/0161757 A1 | 6/2012 | Koch et al. |
| 2012/0161776 A1 | 6/2012 | Koch et al. |
| 2012/0169297 A1 | 7/2012 | Schaefer et al. |
| 2012/0208087 A1 | 8/2012 | Yamamoto et al. |
| 2012/0219852 A1 | 8/2012 | Huang et al. |
| 2012/0227252 A1 | 9/2012 | Nazri |
| 2012/0229096 A1 | 9/2012 | Nazri |
| 2012/0231321 A1 | 9/2012 | Huang et al. |
| 2012/0244390 A1 | 9/2012 | Cheng et al. |
| 2012/0244418 A1 | 9/2012 | Cheng et al. |
| 2012/0264017 A1 | 10/2012 | Nazri et al. |
| 2012/0301790 A1 | 11/2012 | Xiao et al. |
| 2012/0308853 A1 | 12/2012 | Vanimisetti et al. |
| 2012/0308872 A1 | 12/2012 | Huang |
| 2012/0328927 A1 | 12/2012 | Timmons et al. |
| 2013/0071736 A1 | 3/2013 | Xiao et al. |
| 2013/0071742 A1 | 3/2013 | Halalay et al. |
| 2013/0099159 A1 | 4/2013 | Halalay et al. |
| 2013/0122374 A1 | 5/2013 | Verbrugge et al. |
| 2013/0131200 A1 | 5/2013 | Huang |
| 2013/0157125 A1 | 6/2013 | Sachdev et al. |
| 2013/0175998 A1 | 7/2013 | Wang et al. |
| 2013/0177804 A1 | 7/2013 | Verbrugge et al. |
| 2013/0177808 A1* | 7/2013 | Wang et al. ............... 429/219 |
| 2013/0183582 A1 | 7/2013 | Halalay et al. |
| 2013/0189576 A1 | 7/2013 | Verbrugge et al. |
| 2013/0224602 A1 | 8/2013 | Huang |
| 2013/0234674 A1 | 9/2013 | Nazri |
| 2013/0284338 A1 | 10/2013 | Xiao et al. |
| 2013/0319599 A1 | 12/2013 | Huang |
| 2013/0323595 A1 | 12/2013 | Sohn et al. |
| 2014/0023931 A1 | 1/2014 | Huang |
| 2014/0038024 A1 | 2/2014 | Huang |
| 2014/0205905 A1 | 7/2014 | Xiao et al. |
| 2014/0265557 A1 | 9/2014 | Huang et al. |
| 2014/0272526 A1 | 9/2014 | Huang |
| 2014/0272558 A1 | 9/2014 | Xiao et al. |
| 2014/0272569 A1 | 9/2014 | Cai et al. |
| 2014/0272573 A1 | 9/2014 | Xiao et al. |
| 2014/0272578 A1 | 9/2014 | Xiao et al. |
| 2014/0272584 A1 | 9/2014 | Jiang et al. |
| 2014/0272603 A1 | 9/2014 | Yang et al. |

OTHER PUBLICATIONS

Bai, Ying, et al., "Microstructure and electrochemical performances of LiF-coated spinel LiMn2O4," Transactions of Nonferrous Metals Society of China, vol. 17, pp. s892-s896 (2007).

Gaines, Linda, et al., "Costs of Lithium-Ion Batteries for Vehicles," Argonne National Laboratory, Center for Transportation Research (May 2000).

George, Steven M., "Atomic Layer Deposition: An Overview," Chem. Rev., vol. 110, No. 1, pp. 111-131 (2010) (published online Nov. 30, 2009).

Goldstein, David N., et al., "Al2O3 Atomic Layer Deposition with Trimethylaluminum and Ozone Studied by in Situ Transmission FTIR Spectroscopy and Quadrupole Mass Spectrometry," J. Phys. Chem. C, vol. 112, No. 49, pp. 19530-19539 (2008) (published online Nov. 13, 2008).

Lee, Won-Jun, et al., "A Comparative Study on the Si Precursors for the Atomic Layer Deposition of Silicon Nitride Thin Films," Journal of the Korean Physical Society, vol. 45, No. 5, pp. 1352-1355 (Nov. 2004).

Leskelä, Markku, et al., "Atomic layer deposition (ALD): from precursors to thin film structures," Thin Solid Films, vol. 409, pp. 138-146 (2002).

Nikkei Electronics, "New Anode Material Could Boost Lithium Battery Performance by 30 Percent," available at http://www.greentechmedia.com/articles/read/new-anode-material-could-boost-lithium-battery-performance-by-30-percent (Nov. 2, 2010) (2 pages).

Qin, Yan, et al., "Mechanism of LTO Gassing and potential solutions," Argonne National Laboratory Presentation, May 9-13, 2011 (18 pages).

Ramadass, Premanand, et al., "Mathematical Modeling of SEI Formation in Li-Ion Cell Anodes," 202nd Meeting of The Electrochemical Society—Salt Lake City, UT, Oct. 20-25, 2002, (Abstract) (10 pages) (Oct. 23, 2002).

Vetter, J., et al., "Ageing mechanisms in lithium-ion batteries," J. Power Sources, vol. 147, Nos. 1-2, pp. 269-281 (Sep. 9, 2005).

Huntsman Corporation, Jeffamine® ED-2003 Polyetheramine Technical Bulletin, Form 5197-0208 (2007) (2 pages).

Franssila, Sami, Introduction to Microfabrication, Second Ed., p. 53 (2010).

\* cited by examiner

COATINGS FOR LITHIUM TITANATE TO SUPPRESS GAS GENERATION IN LITHIUM-ION BATTERIES AND METHODS FOR MAKING AND USE THEREOF

FIELD

The present disclosure relates to coatings for lithium titanate oxide electroactive materials that suppress gas generation for use in electrochemical devices, such as fluoride-based coatings, methods for making such coatings, and methods for use thereof.

BACKGROUND

This section provides background information related to the present disclosure which is not necessarily prior art.

High-energy density, electrochemical cells, such as lithium-ion batteries can be used in a variety of consumer products and vehicles. Typical lithium-ion batteries comprise a first electrode, such as a cathode, a second electrode such as an anode, an electrolyte material, and a separator. Often a stack of lithium-ion battery cells are electrically connected to increase overall output. Conventional lithium-ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

Many different materials may be used to create these components for a lithium-ion battery. By way of non-limiting example, cathode materials for lithium batteries typically comprise an electroactive material which can be intercalated with lithium ions, such as lithium-transition metal oxides or mixed oxides of the spinel type, for example $LiCoO_2$, $LiMn_2O_4$, $LiNiO_2$, $LiNi_{(1-x-y)}Co_xM_yO_2$ (where $0<x<1$, $y<1$, and M may be Al, Mn, or the like), or lithium iron phosphates. The electrolyte typically contains one or more lithium salts, which may be dissolved and ionized in a non-aqueous solvent. The negative electrode typically includes a lithium insertion material or an alloy host material. Typical electroactive materials for forming an anode include lithium-graphite intercalation compounds, lithium-silicon intercalation compounds, lithium alloys and lithium titanate $Li_{4+x}Ti_5O_{12}$, where $0 \le x \le 3$, such as $Li_4Ti_5O_{12}$ (LTO), which may be a nano-structured LTO. Contact of the anode and cathode materials with the electrolyte can create an electrical potential between the electrodes. When electron current is generated in an external circuit between the electrodes, the potential is sustained by electrochemical reactions within the cells of the battery.

LTO is a particularly desirable negative electrode battery. Many Li-ion batteries can suffer from capacity fade attributable to many factors, including the formation of passive film known as solid electrolyte interface (SEI) layer over the surface of the negative electrode (anode), which is often generated by reaction products of anode material, electrolyte reduction, and/or lithium ion reduction. The SEI layer formation plays a significant role in determining electrode behavior and properties including cycle life, irreversible capacity loss, high current efficiency, and high rate capabilities, particularly advantageous for power battery and start-stop battery use. LTO desirably has certain advantages, like high cut voltage (e.g., cut-off potentials relative to a lithium metal reference potential) that desirably minimizes or avoids SEI formation, and furthermore is a zero-strain material having minimal volumetric change during lithium insertion and deinsertion, thus enabling long term cycling stability, high current efficiency, and high rate capabilities. Such long term cycling stability, high current efficiency, and high rate capabilities are particularly advantageous for power battery and start-stop battery use.

However, while LTO is a promising anode material for high power lithium-ion batteries, providing extremely long life and exceptional tolerance to overcharge and thermal abuse, in certain circumstances, when used with certain cathode materials and electrolytes, LTO may potentially have certain disadvantages. For example, it has been observed that $Li_{4+x}Ti_5O_{12}$ can generate significant quantities of gas, which mainly consists of hydrogen, within a battery cell especially at elevated temperature conditions under charging state. Such gas formation can make it an undesirable choice for commercial use. For safe and successful use, it would be desirable to improve LTO anode materials to suppress gas formation, while employing the desirable aspects of the LTO material that provide durable batteries with sustained high capacity, high discharge rates, and long life.

SUMMARY

This section provides a general summary of the disclosure, and is not a comprehensive disclosure of its full scope or all of its features.

In various aspects, the present disclosure provides an electroactive material for an electrochemical cell. In certain aspects, the electroactive material comprises $Li_{(4+x)}Ti_5O_{12}$, where $0 \le x \le 3$ (LTO) and has a surface coating formed thereon having a thickness of less than or equal to about 30 nm that suppresses formation of gases within the electrochemical cell. More specifically, the surface coating on the LTO suppresses formation of gases that are believed to be formed via a side reaction between electrolyte in the electrochemical cell and functional groups like —OH groups on a surface of the LTO.

In other aspects, the present disclosure provides a method for making an electroactive material for an electrochemical cell that comprises applying a surface coating to an electroactive material that comprises $Li_{(4+x)}Ti_5O_{12}$, where $0 \le x \le 3$ (LTO) via a non-aqueous process. Such non-aqueous processes may include Atomic Layer Deposition (ALD), Chemical Vapor Deposition (CVD), Physical Vapor Deposition (PVD), or non-aqueous wet chemistry. The surface coating formed by such a process has a thickness of less than or equal to about 30 nm and is capable of suppressing formation of gases within the electrochemical cell.

In yet other aspects, the present disclosure provides a method of minimizing or suppressing formation of gases in a lithium-ion battery. In one aspect, the method may comprise applying a surface coating to an electroactive material comprising $Li_{(4+x)}Ti_5O_{12}$, where $0 \le x \le 3$ (LTO) via a non-aqueous process. The electroactive material is used within a negative electrode in a lithium-ion battery. The lithium-ion battery further comprises a positive electrode, a separator, and an electrolyte. Any LTO exposed to electrolyte within the lithium-ion battery has a protective surface coating formed thereon. In certain aspects, the surface coating suppresses greater than or equal to about 99.5% of any gas species that would otherwise be generated by a comparative LTO material lacking the surface coating in a comparative negative electrode, for example, during charging and discharging of the lithium-ion battery for greater than or equal to about 1,000 cycles.

In certain other aspects, the present disclosure provides an electroactive material for an electrochemical cell comprising a fluoride-based surface coating formed on $Li_{(4+x)}Ti_5O_{12}$, where $0 \leq x \leq 3$ (LTO). The fluoride-based surface coating has a thickness of less than or equal to about 15 nm that suppresses substantially all formation of gases within the electrochemical cell for at least 3 years of electrochemical cell use.

In certain other aspects, the present disclosure provides an electroactive material for an electrochemical cell comprising a carbide-based surface coating formed on $Li_{(4+x)}Ti_5O_{12}$, where $0 \leq x \leq 3$ (LTO). The carbide-based surface coating has a thickness of less than or equal to about 15 nm that suppresses substantially all formation of gases within the electrochemical cell for at least 3 years of electrochemical cell use.

In certain other aspects, the present disclosure provides an electroactive material for an electrochemical cell comprising a nitride-based surface coating formed on $Li_{(4+x)}Ti_5O_{12}$, where $0 \leq x \leq 3$ (LTO). The nitride-based surface coating has a thickness of less than or equal to about 15 nm that suppresses substantially all formation of gases within the electrochemical cell for at least 3 years of electrochemical cell use.

In yet other aspects, a lithium-ion electrochemical cell is contemplated that comprises a negative electrode comprising a $Li_{(4+x)}Ti_5O_{12}$ material, where $0 \leq x \leq 3$ (LTO), a positive electrode, a separator, and an electrolyte. Any LTO exposed to electrolyte within the electrochemical cell has a protective surface coating with a thickness of less than or equal to about 30 nm to suppress formation of gas within the electrochemical cell. In certain aspects, the surface coating is capable of suppressing greater than or equal to about 99.5% of any gas species that would otherwise be generated by a comparative LTO material lacking the surface coating in a comparative negative electrode during charging and discharging of the lithium-ion electrochemical cell for greater than or equal to about 1,000 cycles. In other aspects, the surface coating is capable of suppressing gas formation in the lithium-ion electrochemical cell so that any gases generated correspond to less than or equal to about 0.1% of the sealed lithium-ion electrochemical cell volume when gas volume is evaluated at standard temperature and pressure (298 K, 1 atm) conditions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges.

As used herein, the terms "composition" and "material" are used interchangeably to refer broadly to a substance containing at least the preferred chemical compound, but which may also comprise additional substances or compounds, including impurities.

Figure 1:
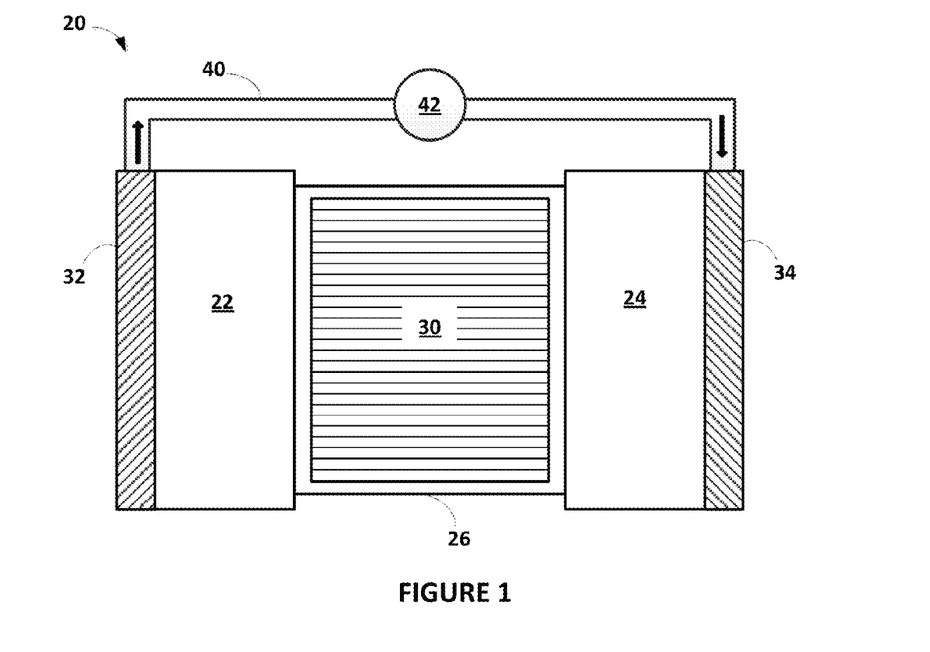
FIG. 1 is a schematic of an exemplary electrochemical battery for purposes of illustration.

Example embodiments will now be described more fully with reference to the accompanying drawings. An exemplary and schematic illustration of a lithium-ion battery 20 is shown in FIG. 1. Lithium-ion battery 20 includes a negative electrode 22, a positive electrode 24, and a separator 30 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34). Each of the negative electrode 22, the positive electrode 24, and the separator 26 may further comprise the electrolyte 30 capable of conducting lithium ions. The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, can provide a minimal resistance path for internal passage of lithium ions (and related anions) for facilitating functioning of the lithium-ion battery 20.

The lithium-ion battery 20 can generate an electric current during discharge by way of reversible electrochemical reactions that occur when the external circuit 40 is closed (to connect the negative electrode 22 and the positive electrode 34) when the negative electrode 22 contains a relatively greater quantity of intercalated lithium. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte 30 and separator 26 towards the positive electrode 24. The electrons flow through the external circuit 40 and the lithium ions migrate across the separator 26 in the electrolyte 30 to form intercalated lithium at the positive electrode 24. The electric current passing through the external circuit 18 can be harnessed and directed through the load device 42 until the intercalated lithium in the negative electrode 22 is depleted and the capacity of the lithium-ion battery 20 is diminished.

The lithium-ion battery 20 can be charged or re-powered at any time by connecting an external power source to the lithium-ion battery 20 to reverse the electrochemical reactions that occur during battery discharge. The connection of an external power source to the lithium-ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with intercalated lithium for consumption during the next battery discharge cycle. The external power source that may be used to charge the lithium-ion battery 20 may vary depending on the size, construction, and particular end-use of the lithium-ion battery 20. Some notable and exemplary external power sources include, but are not limited to, an AC wall outlet and a motor vehicle alternator. In many lithium-ion battery configurations, each of the negative current collector 32, negative electrode 22, the separator 26, positive electrode 24, and positive current collector 34 are prepared as relatively thin layers (for example, several microns or a millimeter or less in thickness) and assembled in layers connected in electrical parallel arrangement to provide a suitable energy package.

Furthermore, the lithium-ion battery 20 can include a variety of other components that while not depicted here are nonetheless known to those of skill in the art. For instance, the lithium-ion battery 20 may include a casing, gaskets, terminal caps, and any other conventional components or materials that may be situated within the battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and hand-held consumer electronic devices, for example, are two examples where the lithium-ion battery 20 would most likely be designed to different size, capacity, and power-output specifications. The lithium-ion battery 20 may also be connected in series or parallel with other similar lithium-ion cells or batteries to produce a greater voltage output and power density if it is required by the load device 42.

Accordingly, the lithium-ion battery 20 can generate electric current to a load device 42 that can be operatively connected to the external circuit 40. The load device 42 may be powered fully or partially by the electric current passing through the external circuit 40 when the lithium-ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy.

Any appropriate electrolyte 30, whether in solid form or solution, capable of conducting lithium ions between the negative electrode 22 and the positive electrode 24 may be used in the lithium-ion battery 20. In certain aspects, the electrolyte solution may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20. A non-limiting list of lithium salts that may be dissolved in an organic solvent to form the non-aqueous liquid electrolyte solution include $LiPF_6$, $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, and combinations thereof. These and other similar lithium salts may be dissolved in a variety of organic solvents, including but not limited to various alkyl carbonates, such as cyclic carbonates (ethylene carbonate (EC), propylene carbonate (PC), butylene carbonate (BC)), acyclic carbonates (dimethyl carbonate (DMC), diethyl carbonate (DEC), ethylmethylcarbonate (EMC)), aliphatic carboxylic esters (methyl formate, methyl acetate, methyl propionate), γ lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The separator 30 may comprise, in one embodiment, a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 30 is a microporous polymeric separator, it may be a single layer or a multi-layer laminate, which may be fabricated from either a dry or wet process. For example, in one embodiment, a single layer of the polyolefin may form the entire microporous polymer separator 30. In other aspects, the separator 30 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 30. The microporous polymer separator 30 may also comprise other polymers in addition to the polyolefin such as, but not limited to, polyethylene terephthalate (PET), polyvinylidene fluoride (PVDF), and/or a polyamide. The polyolefin layer, and any other optional polymer layers, may further be included in the microporous polymer separator 30 as a fibrous layer to help provide the microporous polymer separator 30 with appropriate structural and porosity characteristics. Various conventionally available polymers and commercial products for forming the separator 30 are contemplated, as well as the many manufacturing methods that may be employed to produce such a microporous polymer separator 30.

The positive electrode 24 may be formed from any lithium-based active material that can sufficiently undergo lithium intercalation and deintercalation while functioning as the positive terminal of the lithium-ion battery 20. The positive electrode 24 may include a polymeric binder material to structurally fortify the lithium-based active material. One exemplary common class of known materials that can be used to form the positive electrode 24 is layered lithium transitional metal oxides. For example, in various embodiments, the positive electrode 24 may comprise at least one spinel, like lithium manganese oxide ($Li_{(1+x)}Mn_{(2-x)}O_4$), where $0 \leq x \leq 1$, where x is typically less than 0.15, including $LiMn_2O_4$, lithium manganese nickel oxide, ($LiMn_{(2-x)}Ni_xO_4$), where $0 \leq x \leq 1$ and, e.g., $LiMn_{1.5}Ni_{0.5}O_4$, lithium cobalt oxide ($LiCoO_2$), lithium manganese oxide ($LiMn_2O_4$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, a lithium nickel cobalt metal oxide $LiNi_{(1-x-y)}Co_xM_yO_2$ (wherein $0<x<1$, $y<1$, and M may be Al, Mn, or the like), lithium-transition metal oxides or mixed oxides lithium iron phosphates, or a lithium iron polyanion oxide such as lithium iron phosphate ($LiFePO_4$) or lithium iron fluorophosphate ($Li_2FePO_4F$). A variety of other known lithium-based active materials may also be used. By way of non-limiting example, alternative materials may include lithium nickel oxide ($LiNiO_2$), lithium aluminum manganese oxide ($Li_xAl_yMn_{(1-y)}O_2$), and lithium vanadium oxide ($LiV_2O_5$). In certain variations, the positive electrode 24 comprises at least one of spinel, such as lithium manganese oxide ($Li_{(1+x)}Mn_{(2-x)}O_4$), lithium manganese nickel oxide, ($LiMn_{(2-x)}Ni_xO_4$), where $0 \leq x \leq 1$, lithium manganese nickel cobalt oxide, (e.g., $LiMn_{1/3}Ni_{1/3}Co_{1/3}O_2$), or lithium iron phosphate ($LiFePO_6$). Such active materials may be intermingled with at least one polymeric binder, for example, by slurry casting active materials with such binders, like polyvinylidene fluoride (PVDF), ethylene propylene diene monomer (EPDM) rubber, or carboxymethoxyl cellulose (CMC). The positive current collector 34 may be formed from aluminum or any other appropriate electrically conductive material known to those of skill in the art.

In various aspects, the negative electrode 22 includes an electroactive material as a lithium host material capable of functioning as a negative terminal of a lithium-ion battery. The negative electrode 22 may also include another electrically conductive material, as well as one or more polymeric binder materials to structurally hold the lithium host material together. For example, in one embodiment, the negative electrode 22 may be formed from lithium titanate oxide (LTO) particles intermingled in at least one of polyvinylidene fluoride (PVDF), a nitrile butadiene rubber (NBR), styrene-butadiene rubber (SBR) binder, or carboxymethoxyl cellulose (CMC) as will be discussed in greater detail below, by way of non-limiting example. The negative electrode current collector 32 may be formed from copper or any other appropriate electrically conductive material known to those of skill in the art.

In various aspects of the present disclosure, the negative electrode 22 comprises an active material comprising $Li_4Ti_5O_{12}$ (LTO) modified in accordance with certain principles of the present teachings. LTO is capable of sufficiently undergoing lithium intercalation and de-intercalation, while functioning as the negative terminal of the lithium-ion battery 20. When LTO is intercalated with lithium ions, it transitions from $Li_4Ti_5O_{12}$ to $Li_{4+x}Ti_5O_{12}$, where x ranges from $0 \leq x \leq 3$ (where LTO in a fully intercalated form is $Li_7Ti_5O_{12}$). As discussed previously, LTO is particularly useful as a negative electrode 22 active material, because it has outstanding electrochemical performance and furthermore has little to no volumetric change after lithium insertion. Thus, it is considered a zero-strain material providing superior long term stability. Hence, LTO is a promising electrode material for lithium battery, due to its excellent cycling stability, current efficiency, rate capability. Furthermore, LTO can be designed as a nano-structured material for higher packing density and very high rate capacities. However, as discussed previously, one potential shortcoming to using LTO as a negative electrode 22 is that it appears that over time and at relatively high temperatures, LTO can generate significant amounts of gas. As lithium-ion cells are typically hermetically sealed, such gas generation over time is undesirable. The predominant component in the gas generated by LTO in a lithium-ion battery is hydrogen ($H_2$), the generation of which appears to increase with temperature and state of charge (SoC). LTO and the typical active materials for cathodes (e.g., ($Li_{(1+x)}Mn_{(2-x)}O_4$) do not themselves contain a source of hydrogen and thus do not by themselves generate hydrogen. Furthermore, while lithium electrolytes have a source of hydrogen (e.g., from non-aqueous solvents, like alkyl carbonates), the electrolytes are typically stable at ambient temperatures. Furthermore, the issue of gas generation seems to be specific to use of LTO or similar materials as negative electrode active materials, while changing the cathode active materials does not mitigate generation of the gas.

Figure 2:
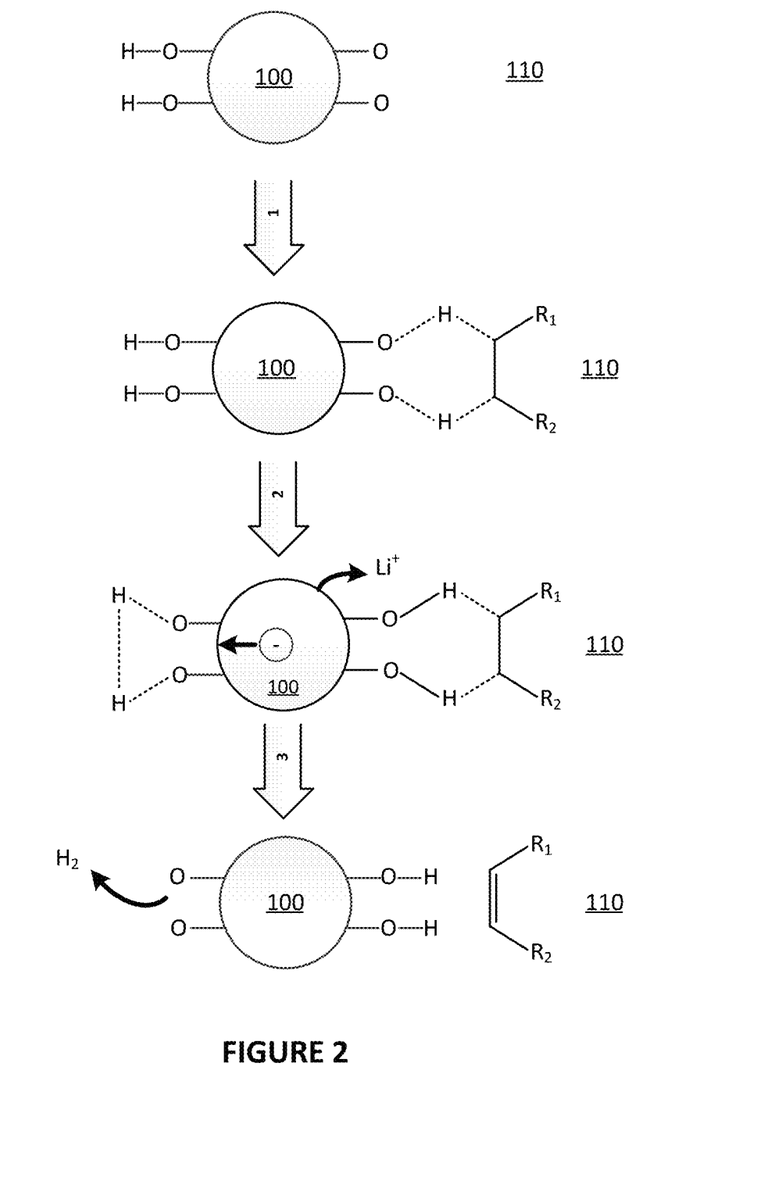
FIG. 2 is an exemplary schematic showing a theorized mechanism of gas generation by solvent adsorption on lithium titanate oxide electroactive materials in a lithium-ion electrochemical cell.

While not limiting the present teachings to any particular theory, it is theorized that solvents, such as alkyl carbonates in the electrolyte solution (by way of non-limiting example, ethylene carbonate (EC), diethyl carbonate (DEC), and ethylmethylcarbonate (EMC)) provide a source of hydrogen via the carbonates. Thus, it is theorized that the active metal oxides (LTO) may adsorb such solvents and/or act as a catalyst to promote chemical or electrochemical decomposition of the hydrogen source(s) from the electrolyte, thus forming hydrogen gas and other undesirable byproducts. As background, an exemplary mechanism is shown in FIG. 2 for what is believed to be a mechanism for hydrogen gas generation with LTO electrodes based upon Qin et al., Mechanism of LTO Gassing and Potential Solutions, Argonne National Laboratory (May 9-13, 2011), the relevant portions of which are incorporated herein by reference.

An exemplary particle of $Li_{(4+x)}Ti_5O_{12}$, where $0 \leq x \leq 3$ (LTO) particle is shown as 100. Adjacent or nearby to the particle is electrolyte 110. As noted above, in addition to lithium salts, conventional electrolyte 110 solutions also comprise solvents, such as alkyl carbonates. Thus, the electrolyte 110 comprises a solvent or hydrogen source. After arrow 1, such a solvent species is shown adsorbed to a surface of the LTO 100. After arrow 2, a hydroxyl group is reduced and a lithium ion is released. This causes hydrogen gas to be released and chemical decomposition of the solvent (shown as $R_1C=CR_2$), where the LTO 100 may serve as a catalyst for such reactions to occur. Overall, gas generation is thus theorized to come from chemical reduction of —OH groups on $Li_7Ti_5O_{12}$ with assistance of the solvent in the electrolyte. Suppression of such gas generated from LTO can further improve the safety and life of lithium-ion batteries.

Thus, in accordance with various aspects of the present teachings, the negative anode material, which otherwise generates gas within an electrochemical cell, comprises a surface coating that reduces or eliminates generation of gases by consuming or binding —OH groups and therefore suppressing or minimizing any adverse side reactions with species present in the electrolyte or battery cell. In certain variations, a surface coating on the anode material particles suppresses gas formation comprises a fluoride-based coating, a carbide-based coating, or a nitride-based coating. While the present teachings are primarily directed to lithium titanate oxide (LTO), the principles of using surface coatings to suppress gas formation may be used in conjunction with any other electroactive materials that undesirably generate gases within an electrochemical cell or battery. In certain variations, a surface coating on the anode material particles which suppresses gas formation comprises fluorine and is a fluoride-based coating. By fluoride-based coating, it is meant that the coating is applied with precursors to form a fluoride-containing coating, but such precursors may further react with reactive groups on the surface of the lithium titanate to form hybridized compounds. As many reactive groups on the lithium titanate are reactive hydrogen or hydroxyl groups, oxygen-containing species may likewise be formed. The fluoride-based coating can avoid or eliminate active groups terminated on the LTO surface, and also prevent lithium ion self-discharge from LTO. Such a concept similarly applies to carbide-based and nitride-based coatings, which may likewise contain oxygen-containing species.

Applying such a thin fluoride-based surface coating on LTO electrode or particles causes a reaction with surface functional groups, which are responsible for the gas generation, especially for generation of hydrogen gas ($H_2$). More specifically, fluoride-based surface coatings are believed to react with surface functional groups on the lithium titanate (LTO) surface, including OH and H groups, which are presumed to be responsible for most of the gas generation from LTO under charging state. Such a fluoride-based surface coating can significantly suppress or eliminate gas generation.

In certain variations, the surface coating is formed from a precursor (or one or more precursors) for an aluminum fluoride ($AlF_3$) coating, a lithium fluoride (LiF) coating, or combinations thereof. Such a fluoride-based coating may be formed with one or more precursors for forming an LiF coating that when reacted with the LTO surface groups forms an oxyfluoride-containing coating, which comprises various oxygen containing species, such as $Li_2O$ in addition to LiF. In other variations, a fluoride-based coating may be formed with a precursor for an $AlF_3$ coating, which when reacted with surface groups of the LTO similarly forms an oxyfluoride-containing coating having various oxygen containing species, such as $Li_2O$ in addition to $AlF_3$.

In certain aspects, the present disclosure provides a method for making an electroactive material for an electrochemical cell that comprises applying a surface coating to an electroactive material that comprises $Li_{(4+x)}Ti_5O_{12}$, where $0 \leq x \leq 3$ (LTO) via a non-aqueous process. The surface coating formed by such a process has a thickness of less than or equal to about 30 nm and is capable of suppressing formation of gases within the electrochemical cell. As noted above, in certain variations, the process for applying the surface coating may be non-aqueous atomic layer deposition (ALD), chemical vapor deposition, physical vapor deposition, or non-aqueous wet chemistry techniques with any of the precursors and conditions described above or herein.

Thus, in accordance with certain aspects of the present disclosure, a material is provided that comprises $Li_{(4+x)}Ti_5O_{12}$, where $0 \leq x \leq 3$ (LTO) and further has a surface coating applied thereto to suppress formation of gases. The surface coating may be applied to any surface of the LTO that may be exposed to electrolyte or solvent within the electrochemical cell to minimize reaction and/or adsorption of such species, as will be discussed in greater detail below. In certain variations, the surface coating is a fluoride-based surface coating. In certain embodiments, the fluoride-based surface coating comprises a material selected from the group consisting of:

aluminum fluoride ($AlF_3$), lithium fluoride (LiF), and combinations thereof. Such a fluoride-based surface coating may be formed by using one or more precursors for an aluminum fluoride ($AlF_3$) or lithium fluoride (LiF) coating applied to a surface of the lithium titanate, which as noted above, such precursors may also react with exposed reactive groups on the LTO to form additional species from the LiF or $AlF_3$, such as oxygen containing species, like $Li_2O$, by way of non-limiting example.

In various aspects, such a surface coating is applied by a non-aqueous deposition process. In certain aspects, the surface coating may be applied by a modified non-aqueous atomic layer deposition (ALD) process that can coat the LTO material with a conformal layer, for example, comprising aluminum fluoride ($AlF_3$) and/or lithium fluoride (LiF). While typical ALD coatings are applied with aqueous reactants, in certain aspects, the present disclosure provides methods for applying a surface coating to LTO via a non-aqueous ALD process that avoids use of any water within the deposition process. For example, in applying LiF via a non-aqueous ALD deposition process, the following precursors can be used to form the LiF based coating: $LiO^tBu$ and $TiF_4$. For applying $AlF_3$ via a non-aqueous ALD deposition process, the following precursors can be used to form the $AlF_3$ based coating: trimethylaluminum (TMA) and $TiF_4$.

The process can be illustrated by the formation of aluminum fluoride ($AlF_3$), but the process may also be used to form lithium fluoride, by way of non-limiting example. Moreover, in alternative variations, $AlF_3$ or LiF coatings can be easily obtained by using different precursors. For example, the fluoride (F) precursor can be $NiF_2$, $CaF_2$, $TiF_4$, $TiF_2$, $MgF_2$, $WF_6$ and/or active metallic fluorides (having a heating temperature above 160° C.).

In other alternative variations, a fluoride-based surface coating can be synthesized on the material comprising $Li_{(4+x)}Ti_5O_{12}$ (LTO) by non-aqueous wet chemistry, physical vapor deposition (PVD), chemical vapor deposition (CVD) and other known conventional processes to apply such coatings to solid materials. For example, in a PVD process, such as magnetron sputtering, $AlF_3$ can be used as target, with argon (Ar) as the gas to deposit an $AlF_3$ coating on the pre-fabricated LTO electrode or alternatively LTO particles. In a thermal or CVD process, TMA and $NF_3$ at temperatures above 400° C. for thermal CVD and above about 200° C. can be used for plasma CVD deposition on the pre-fabricated LTO electrode or alternatively LTO particles, by way of example.

Thus, in certain variations, the applying of the surface coating can be conducted by a non-aqueous atomic layer deposition process with a precursor selected from the group consisting of: lithium fluoride (LiF), aluminum fluoride ($AlF_3$), titanium carbide (TiC), silicon carbide (SiC), titanium nitride (TiN), vanadium nitride (VN), aluminum nitride (AlN, where the precursor is TMA and ammonia), and the like. Thus, applying the surface coating may comprise a non-aqueous deposition process including one or more coating precursor species to form a carbide-based surface coating, such as TiC, SiC, WC (for example, TiC can be formed by sputtering TiC target, or CVD with titanium tetrachloride and $CH_4$ as precursors), or a nitride-based surface coating, such as AlN, TiN, VN (TiN, sputtering Ti target with $N_2$, or CVD with titanium tetrachloride and $NH_3$ as precursors), by way of example.

In certain aspects, the present disclosure provides a surface coating formed on an LTO material that is formed from a precursor material selected from the group consisting of: lithium fluoride (LiF), aluminum fluoride ($AlF_3$), titanium carbide (TiC), silicon carbide (SiC), tungsten carbide (WC), titanium nitride (TiN), aluminum nitride (AlN), vanadium nitride (VN), and combinations thereof. In certain variations, the surface coating is a fluoride-based surface coating applied with a precursor material for a coating selected from the group consisting of: lithium fluoride (LiF), aluminum fluoride ($AlF_3$), and combinations thereof. In other variations, the surface coating applied is an oxyfluoride-based surface coating formed from a lithium fluoride (LiF) precursor material.

Negative electrodes may comprise about 50% to about 90% of an electroactive material (e.g., particles of LTO), about 5% to about 30% of an electrically conductive material, and a balance binder. Suitable electrically conductive materials include carbon black, graphite, powdered nickel, metal particles, conductive polymers, and combinations thereof and mixtures thereof. Useful binders may comprise a polymeric material and extractable plasticizer suitable for forming a bound porous composite, such as halogenated hydrocarbon polymers (such as poly(vinylidene chloride) and poly ((dichloro-1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, and mixtures thereof.

An electrode may be made by mixing the electrode active material, such as LTO powder or particles, into a slurry with a polymeric binder compound, a non-aqueous solvent, optionally a plasticizer, and the electrically conductive particles. The slurry can be mixed or agitated, and then thinly applied to a substrate via a doctor blade. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calendar it. In other variations, the film may be air-dried at moderate temperature to form self-supporting films. If the substrate is removable, then it is removed from the electrode film that is then further laminated to a current collector. With either type of substrate it may be necessary to extract or remove the remaining plasticizer prior to incorporation into the battery cell.

In various aspects, the surface coating is a thin layer applied to one or more preselected surface regions of lithium titanate, which provides sufficient coverage of the exposed surface regions of LTO to minimize adsorption and/or reaction of solvents and other hydrogen source species in the battery cell, while minimizing electrical impedance at the electroactive material surface. A thickness of the surface coating may be considered to be the region of the surface of the LTO that has reacted with the precursors of the surface coating to form a distinct chemical composition from $Li_{(4+x)}Ti_5O_{12}$, where $0 \leq x \leq 3$ (LTO). In certain variations, a thickness of the surface coating on the LTO is ultrathin and is less than or equal to about 30 nm, optionally less than or equal to about 25 nm, optionally less than or equal to about 20 nm, optionally less than or equal to about 15 nm, optionally less than or equal to about 10 nm, optionally less than or equal to about 9 nm, optionally less than or equal to about 8 nm, optionally less than or equal to about 7 nm, optionally less than or equal to about 6 nm, optionally less than or equal to about 5 nm, optionally less than or equal to about 4 nm, optionally less than or equal to about 3 nm, optionally less than or equal to about 2 nm, optionally less than or equal to about 1 nm, and in certain variations optionally less than or equal to about 0.75 nm. In certain variations, a thickness of the surface coating may be greater than or equal to about 0.5 nm to less than or equal to about 10 nm, optionally greater than or equal to about 0.5 nm to less than or equal to about 5 nm, and in certain variations, optionally greater than or equal to about 0.5 nm to less than or equal to about 3 nm.

In certain preferred variations, pre-fabricated electrodes formed of LTO via the active material slurry casting described above can be directly coated via non-aqueous atomic layer deposition (ALD), or physical vapor deposition, or chemical vapor infiltration with a surface coating. Thus, one or more exposed regions of the pre-fabricated electrodes comprising the LTO can be coated to suppress gas formation from LTO in the electrode. In other variations, a plurality of particles comprising an electroactive material like LTO can be coated with a fluoride-based surface coating by using a wet chemistry technique or CVD with a fluidized bed reactor. Then, the coated particles can be used in the active material slurry to form the electrode, as described above.

As discussed above, a battery may have a laminated cell structure, comprising an anode layer, a cathode layer, and electrolyte/separator between the anode and cathode layers. The anode and cathode layers each comprise a current collector. A negative anode current collector may be a copper collector foil, which may be in the form of an open mesh grid or a thin film. The current collector can be connected to an external current collector tab.

For example, in certain variations, an electrode membrane, such as an anode membrane, comprises the electrode active material (e.g., LTO) dispersed in a polymeric binder matrix over a current collector. The separator can then be positioned over the negative electrode element, which is covered with a positive electrode membrane comprising a composition of a finely divided lithium insertion compound in a polymeric binder matrix. A positive current collector, such as aluminum collector foil or grid completes the assembly. Tabs of the current collector elements form respective terminals for the battery. A protective bagging material covers the cell and prevents infiltration of air and moisture. Into this bag, an electrolyte is injected into the separator (and may also be imbibed into the positive and/or negative electrodes) suitable for lithium ion transport. In certain aspects, the laminated battery is further hermetically sealed prior to use.

Thus, in certain variations, the present disclosure provides an electroactive material, which may be used in an electrochemical cell, such as a lithium-ion battery, which comprises $Li_{(4+x)}Ti_5O_{12}$, where $0 \leq x \leq 3$ (LTO) and has a surface coating formed thereon having a thickness of less than or equal to about 30 nm that suppresses formation of gases within the electrochemical cell. In certain variations, the LTO material is contained in a pre-fabricated electrode layer and the surface coating is applied to at least one surface of the pre-fabricated electrode layer. In other variations, the surface coating is applied to a plurality of LTO particles, which can then be incorporated into the electrode. In certain aspects, the surface coating is a fluoride-based surface coating, a carbide-based surface coating, or a nitride-based surface coating. In certain variations, the surface coating is a fluoride-based surface coating formed from a precursor material selected from the group consisting of: lithium fluoride (LiF), aluminum fluoride ($AlF_3$), and combinations thereof. In certain aspects, the surface coating is an oxyfluoride-based surface coating formed from a lithium fluoride (LiF) precursor material. In preferred aspects, the thin surface coating on the LTO is formed in a non-aqueous deposition process.

In various aspects, the surface coating is capable of suppressing greater than or equal to about 99.5% of gases that would otherwise be generated by a comparative LTO material lacking the surface coating. In certain aspects, the surface coating suppresses greater than or equal to about 99.7%, optionally 99.8%, optionally 99.9%, and in certain aspects, 99.99% of gases that would otherwise be generated by a comparative bare LTO material that lacks the inventive surface coating.

In certain aspects, it is preferred that an electroactive material having a surface coating for suppressing gas formation in an electrochemical cell, such as a lithium-ion battery, for example comprising LTO does not generate any or only minimal amounts of gaseous compounds during the life of the battery. For example, in certain aspects, an electrochemical cell or lithium-ion battery comprising an electroactive material having a surface coating according to certain variations of the present disclosure is substantially free of gaseous compounds through the life of the electrochemical cell or battery. "Substantially free" is intended to mean that the compound is absent to the extent that it cannot be detected or that if the compound is present, it does not cause undue detrimental impact and/or prevent the overall use of the battery for its intended purpose. In some aspects, it is preferred that a concentration of gaseous compounds generated in the electrochemical cell is less than about 1,000 parts per million (ppm), optionally less than about 500 ppm, optionally less than about 100 ppm, optionally less than about 75 ppm, and in some preferred aspects, optionally less than about 50 ppm when the electrochemical cell or battery is stored over time. In some aspects, it is preferred that the gases generated correspond to less than or equal to about 0.1% of the sealed cell volume when the gas volume is evaluated at standard temperature and pressure (298 K, 1 atm) conditions, for example, after 100 hours of storage or more; optionally less than or equal to about 0.05% of the sealed cell volume; and in certain aspects, optionally less than or equal to about 0.01% of the sealed cell volume at standard temperature and pressure conditions.

In certain aspects, the lithium-ion electrochemical cell incorporating an inventive electroactive material having a surface coating for suppressing gas formation has a rate capacity of greater than or equal to about 0.05C(C/20) to greater than or equal to about 20 Coulombs, where the lithium-ion electrochemical cell is substantially free of gas generation for a standard lifetime of the electrochemical cell.

In certain variations, a lithium-ion battery incorporating an inventive electroactive material having a surface coating for suppressing gas formation is substantially free of gaseous species for at least 500 hours of battery operation, optionally greater than or equal to about 1,000 hours of battery operation, optionally greater than or equal to about 1,500 hours of battery operation, and in certain aspects, greater than or equal to about 2,000 hours or longer of battery operation (active cycling). In certain variations, the lithium-ion battery incorporating an inventive electroactive material having a surface coating for suppressing gas formation is substantially free generated gaseous species for a duration of greater than or equal to about 2 years (including storage at ambient conditions and active cycling time), optionally greater than or equal to about 3 years, optionally greater than or equal to about 4 years, optionally greater than or equal to about 5 years, optionally greater than or equal to about 6 years, optionally greater than or equal to about 7 years, optionally greater than or equal to about 8 years, optionally greater than or equal to about 9 years, and in certain aspects, optionally greater than or equal to about 10 years. Stated in another way, in certain aspects, a lithium-ion battery or electrochemical cell incorporating the inventive electroactive material having a surface coating for suppressing gas formation will be substantially free of gaseous species for at least 1,000 deep discharge cycles, optionally greater than or equal to about 2,000 deep discharge cycles, optionally greater than or equal to about 3,000 deep discharge cycles, optionally greater than or equal to about 4,000 deep discharge cycles, and in certain variations, optionally greater than or equal to about 5,000 deep discharge cycles.

In certain other aspects, the present disclosure provides an electroactive material for an electrochemical cell comprising a fluoride-based surface coating formed on $Li_{(4+x)}Ti_5O_{12}$, where $0 \leq x \leq 3$ (LTO). The fluoride-based surface coating has a thickness of less than or equal to about 15 nm that suppresses substantially all formation of gases within the electrochemical cell for at least 3 years of electrochemical cell use.

In certain other aspects, the present disclosure provides an electroactive material for an electrochemical cell comprising a carbide-based surface coating formed on $Li_{(4+x)}Ti_5O_{12}$, where $0 \leq x \leq 3$ (LTO). The carbide-based surface coating has a thickness of less than or equal to about 15 nm that suppresses substantially all formation of gases within the electrochemical cell for at least 3 years of electrochemical cell use.

In certain other aspects, the present disclosure provides an electroactive material for an electrochemical cell comprising a nitride-based surface coating formed on $Li_{(4+x)}Ti_5O_{12}$, where $0 \leq x \leq 3$ (LTO). The nitride-based surface coating has a thickness of less than or equal to about 15 nm that suppresses substantially all formation of gases within the electrochemical cell for at least 3 years of electrochemical cell use.

EXAMPLES

Comparative Example 1

A battery half-cell with LTO as a working electrode and lithium (Li) foil as a counter electrode is formed with an electrolyte comprising 1M $LiPF_6$ in 50% ethylene carbonate (EC) and 50% diethyl carbonate (DEC), and a separator. The battery half-cell is stored at 55° C. for 100 hours. Gas output is measured and tested via gas chromatography-mass spectrometry (GC-Mass). Testing is conducted at the end of test to determine quantities of gas produced.

Comparative Example 2

A negative electrode material comprising $Li_4Ti_5O_{12}$ (LTO) coated with aluminum oxide ($Al_2O_3$) applied via a typical atomic layer deposition aqueous process is provided for purposes of comparison in Comparative Example 2. A typical reaction for coating the LTO anode material is $2Al(CH_3)_3 + 3H_2O \rightarrow Al_2O_3 + 6CH_4$. Thus, in this Comparative Example, a surface coating is formed on the LTO comprising aluminum oxide, but lacks any halogen, carbide or nitride atoms. A surface coating thickness is around 2 nm. A battery half-cell with LTO as work electrode and Li foil as a counter electrode, an electrolyte comprising 1M $LiPF_6$ in 50% EC and 50 DEC, and a separator are stored at 55° C. for 100 hours. Gas output is measured and tested via gas chromatography-mass spectrometry (GC-Mass). Testing is conducted at the end of test to determine quantities of gas produced.

Example 3

A battery cell having a negative electrode material comprising $Li_4Ti_5O_{12}$ (LTO) is coated with aluminum fluoride ($AlF_3$), which is applied via a non-aqueous atomic layer deposition (ALD) at about 120° C. For example, a typical reaction for coating the anode material in a non-aqueous ALD process is $3TiF_4 + 2Al(CH_3)_3 \rightarrow 2AlF_3 + 3TiF_2\uparrow + 6CH_x\uparrow$. Thus, a surface coating is formed on the LTO comprising aluminum fluoride ($AlF_3$). The surface coating thickness is around 2 nm. A battery half-cell with LTO as a work electrode, Li foil as a counter electrode, an electrolyte comprising 1M $LiPF_6$ in 50% EC and 50% DEC, and a separator are stored at 55° C. for 100 hours. Gas output is measured and tested via gas chromatography-mass spectrometry (GC-Mass). Testing is conducted at the end of test to determine quantities of gas produced.

Example 4

A battery cell having a negative electrode material comprising $Li_4Ti_5O_{12}$ (LTO) is coated with lithium fluoride (LiF), which is applied via a non-aqueous atomic layer deposition at about 120° C. A fluoride-based surface coating comprising lithium fluoride is formed on the LTO by using a non-aqueous ALD deposition process with $LiO^tBu$ and $TiF_4$ as precursors in a similar process to that described in Example 3. The surface coating thickness is around 2 nm. A battery half cell with LTO as work electrode and Li foil as counter electrode, an electrolyte comprising 1M $LiPF_6$ in 50% EC and 50% DEC, and a separator are stored at 55° C. for 100 hours. Gas output is measured and tested via gas chromatography-mass spectrometry (GC-Mass). Testing is conducted at the end of test to determine quantities of gas produced.

Comparative results of gas generation from Comparative Examples 1-2 and Examples 3-4 prepared in accordance with certain variations of the present disclosure are provided in Table 1 below.

TABLE 1

| Gas | Comparative Ex. 1 Bare LTO | Comparative Ex. 2 20 $Al_2O_3$ coating on LTO | Ex. 3 20 LiF coating on LTO | Ex. 4 20 $AlF_3$ coating on LTO |
|---|---|---|---|---|
| Hydrogen (ppm) | 1 | 0.86 | 0.14 | 0.03 |
| Carbon Monoxide (ppm) | 0.13 | 1.54 | Not detectable <0.01 | Not detectable <0.01 |
| Carbon Dioxide (ppm) | 1.02 | 2.58 | 1.57 | 0.24 |
| Methane (ppm) | 0.01 | 0.01 | Not detectable <0.01 | Not detectable <0.01 |
| Ethylene (ppm) | | | Not detectable <0.01 | Not detectable <0.01 |
| Mass of the LTO electrode | 10.27 mg | 10.11 mg | 9.24 mg | 9.14 mg |

As can be seen, fluoride-based coatings of Examples 3 and 4 significantly reduced or suppressed gas generation. For example, with regard to hydrogen, Example 3 had at least about 86% less hydrogen as compared to conventional LTO with no surface coatings (Comparative Example 1). Example 4 had about 97% less hydrogen generated than Comparative Example 1. Furthermore, while the aluminum oxide coating on LTO of Comparative Example 2 did serve to reduce the hydrogen generated, it only reduced the hydrogen generation by about 14%, which is considered to be insufficient for long-term use. Further, generation of carbon dioxide and carbon monoxide in Comparative Example 2 was significantly higher than bare LTO in Comparative Example 1. For Comparative Example 4, measured levels of hydrogen, carbon monoxide, carbon dioxide, methane, and ethylene generated are all significantly reduced (or the same desirably low levels). For Comparative Example 3, while hydrogen, carbon monoxide, methane, and ethylene are reduced or at the same non-detectable levels, carbon dioxide is elevated as compared to that generated by bare LTO in Comparative Example 1.

Therefore, in accordance with certain aspects of the present disclosure, to suppress gas generation from electroactive materials that undesirably generate gases within electrochemical cells, such as lithium titanate oxide materials (LTO). The electroactive materials are coated with an ultrathin surface coating that desirably suppresses or eliminates formation of gases, while still permitting electrical conduction through the electrode (because the ultrathin protective coating avoids introducing additional impedance). This serves to improve the safety and battery life when using LTO as the negative electrode active material. This is especially advantageous to improve useful life for start-stop lithium-ion batteries.

Specifically disclosed are embodiments of an electroactive material for an electrochemical cell, which optionally comprises $Li_{(4+x)}Ti_5O_{12}$, where $0 \leq x \leq 3$ (LTO). The electroactive material further comprises a surface coating formed thereon that suppresses formation of gases within the electrochemical cell that optionally has any one or any combination of more than one of the following features: (1) a thickness of less than or equal to about 30 nm; (2) LTO being contained in a pre-fabricated electrode layer, so that the surface coating is applied to at least one surface of the pre-fabricated electrode layer; (3) the surface coating being applied to a plurality of LTO particles that form an electrode; (4) the surface coating being a fluoride-based surface coating, a carbide-based surface coating, or a nitride-based surface coating; (5) the surface coating being a fluoride-based surface coating formed from a precursor material selected from the group consisting of: lithium fluoride (LiF), aluminum fluoride ($AlF_3$), and combinations thereof; (6) the surface coating being an oxyfluoride-based surface coating formed from a lithium fluoride (LiF) precursor material; (7) the surface coating formed in a non-aqueous deposition process; (8) the surface coating is capable of suppressing greater than or equal to about 99.5% of gases that would otherwise be generated by a comparative LTO material lacking the surface coating; and/or (9) the surface coating is capable of suppressing greater than or equal to about 99.9% of gases that would otherwise be generated by a comparative LTO material lacking the surface coating, wherein these features include all values and endpoints of numerical ranges and combinations thereof and all materials and combinations of materials disclosed above that may be included in compositions mentioned for these features.

In yet other aspects, the present disclosure contemplates embodiments of an electroactive material for an electrochemical cell comprising (10) a fluoride-based surface coating formed on $Li_{(4+x)}Ti_5O_{12}$, where $0 \leq x \leq 3$ (LTO), where the fluoride-based surface coating optionally has a thickness of less than or equal to about 15 nm and (11) which serves to suppresses substantially all formation of gases within the electrochemical cell for at least 3 years of electrochemical cell use; optionally (12) the fluoride-based surface coating is an oxyfluoride-based surface coating formed from a lithium fluoride (LiF) precursor material; (13) a carbide-based surface coating formed on $Li_{(4+x)}Ti_5O_{12}$, where $0 \leq x \leq 3$ (LTO) having a thickness of less than or equal to about 15 nm, which serves to suppress substantially all formation of gases within the electrochemical cell for at least 3 years of electrochemical cell use; and/or (14) a nitride-based surface coating formed on $Li_{(4+x)}Ti_5O_{12}$, where $0 \leq x \leq 3$ (LTO) having a thickness of less than or equal to about 15 nm that suppresses substantially all formation of gases within the electrochemical cell for at least 3 years of electrochemical cell use.

All possible combinations discussed and enumerated above as optional features of these materials are specifically disclosed as embodiments. Also specifically disclosed are combinations including this electroactive material having a surface coating optionally with any one or any combination of more than one of the enumerated features (1)-(14).

In other aspects, embodiments of the present teachings include methods of making an electroactive material for an electrochemical cell that comprise applying a surface coating to an electroactive material that comprises $Li_{(4+x)}Ti_5O_{12}$, where $0 \leq x \leq 3$ (LTO) via a non-aqueous process, where the surface coating formed by such a process has a thickness of less than or equal to about 30 nm and is capable of suppressing formation of gases within the electrochemical cell; optionally including the following steps or features: (1) the applying process is selected from the group consisting of: non-aqueous atomic layer deposition (ALD), physical vapor deposition (PVD), chemical vapor deposition (CVD), and non-aqueous wet chemistry; (2) where the LTO is contained in a pre-fabricated electrode layer, so that the surface coating is applied to at least one surface of the pre-fabricated electrode layer; (3) the surface coating is applied directly to a plurality of LTO particles, which are then used to form an electrode; (4) the surface coating is a fluoride-based surface coating, a carbide-based surface coating, or a nitride-based surface coating; (5) wherein the surface coating is formed from a precursor material selected from the group consisting of: lithium fluoride (LiF), aluminum fluoride ($AlF_3$), titanium carbide (TiC), silicon carbide (SiC), tungsten carbide (WC), titanium nitride (TiN), aluminum nitride (AlN), vanadium nitride (VN), and combinations thereof; (6) the surface coating is a fluoride-based surface coating applied with a precursor material for a coating selected from the group consisting of: lithium fluoride (LiF), aluminum fluoride ($AlF_3$), and combinations thereof; (7) the surface coating applied is an oxyfluoride-based surface coating formed from a lithium fluoride (LiF) precursor material; (8) the surface coating applied suppresses greater than or equal to about 99.5% of gases that would otherwise be generated by a comparative LTO material lacking the surface coating; and (9) the surface coating applied suppresses greater than or equal to about 99.9% of gases that would otherwise be generated by a comparative LTO material lacking the surface coating.

As mentioned, all possible combinations of the enumerated optional features of these methods are specifically disclosed as embodiments. Also specifically disclosed are combinations including using such a method of forming an electroactive material having a surface coating to suppress gas formation optionally with any one or any combination of more than one of the enumerated steps or features listed in (1)-(9).

The disclosure also contemplates methods of minimizing or suppressing formation of gases in a lithium-ion battery that optionally have any one or any combination of more than one of the following steps or features: (1) applying a surface coating to an electroactive material comprising $Li_{(4+x)}Ti_5O_{12}$, where $0 \leq x \leq 3$ (LTO) via a non-aqueous process; (2) where the electroactive material is used in a negative electrode in a lithium-ion battery that further comprises a positive electrode, a separator, and an electrolyte, so that any LTO material exposed to electrolyte has a protective surface coating formed thereon so that the surface coating suppresses greater than or equal to about 99.5% of any gas species that would otherwise be generated by a comparative LTO material lacking the surface coating in a comparative negative electrode during charging and discharging of the lithium-ion battery for greater than or equal to about 1,000 cycles; (3) where the LTO is optionally contained in a pre-fabricated electrode layer and the applying of the surface coating comprises applying the surface coating to at least one exposed surface of the pre-fabricated electrode layer; (4) where the surface coating is applied to a plurality of LTO particles and the method further comprises forming the negative electrode material after the applying, by slurry casting the plurality of LTO particles having a surface coating with a plurality of electrically conductive particles, like carbon black, and one or more polymeric binders; (5) where the applying of the surface coating comprises a non-aqueous atomic layer deposition process with a precursor selected from the group consisting of: lithium fluoride (LiF), aluminum fluoride (AlF$_3$), titanium carbide (TiC), silicon carbide (SiC), tungsten carbide (WC), titanium nitride (TiN), aluminum nitride (AlN), vanadium nitride (VN), and combinations thereof; (6) where the applying of the surface coating comprises a non-aqueous deposition process of one or more coating precursor species to form a fluoride-based surface coating, a carbide-based surface coating, or a nitride-based surface coating; (7) where the applying of the surface coating comprises a non-aqueous deposition process of one or more coating precursor species to form a carbide-based surface coating, such as TiC or WC; (8) where the applying of the surface coating comprises a non-aqueous deposition process of one or more coating precursor species to form a nitride-based surface coating, such as AlN, TiN, or VN; (9) where the applying of the surface coating comprises a process selected from the group consisting of: physical vapor deposition, chemical vapor deposition, a non-aqueous wet chemistry, and combinations thereof; and/or (10) the surface coating is capable of suppressing gas formation in the lithium-ion electrochemical cell so that any gases generated correspond to less than or equal to about 0.1% of the sealed lithium-ion electrochemical cell volume when gas volume is evaluated at standard temperature and pressure (298 K, 1 atm) conditions.

As mentioned, all possible combinations of the enumerated optional features of these methods are specifically disclosed as embodiments. Also specifically disclosed are combinations including using such an electroactive material having a surface coating to suppress gas formation optionally with any one or any combination of more than one of the enumerated features (1)-(10).

Also specifically disclosed are embodiments of a lithium-ion electrochemical cell that comprises a negative electrode comprising a $Li_{(4+x)}Ti_5O_{12}$ material, where 0≤x≤3 (LTO), a positive electrode; a separator; and an electrolyte; where any LTO exposed to electrolyte within the electrochemical cell has a protective surface coating with a thickness of less than or equal to about 30 nm to suppress formation of gas within the electrochemical cell and has the following optional features: (1) the surface coating suppresses greater than or equal to about 99.5% of any gas species that would otherwise be generated by a comparative LTO material lacking the surface coating in a comparative negative electrode during charging and discharging of the lithium-ion electrochemical cell for greater than or equal to about 1,000 cycles; (2) the protective surface coating is selected from a fluoride-based surface coating, a carbide-based surface coating, or a nitride-based surface coating; (3) the protective surface coating is a fluoride-based surface coating formed from a precursor of a LiF coating; (4) the protective surface coating is a fluoride-based surface coating; (5) the positive electrode is a material selected from the group consisting of: lithium manganese oxide ($Li_{(1+x)}Mn_{(2-x)}O_4$), where 0≤x≤1; lithium manganese nickel oxide ($LiMn_{(2-x)}Ni_xO_4$), where 0≤x≤1; lithium nickel manganese cobalt oxide ($Li(Ni_xMn_yCo_z)O_2$), where 0≤x≤1, 0≤y≤1, 0≤z≤1, and x+y+z=1, and combinations thereof; (6) the electrolyte comprises a salt selected from the group consisting of: $LiPF_6$, $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, and combinations thereof; and/or (7) the surface coating is capable of suppressing gas formation in the lithium-ion electrochemical cell so that any gases generated correspond to less than or equal to about 0.1% of the sealed lithium-ion electrochemical cell volume when gas volume is evaluated at standard temperature and pressure (298 K, 1 atm) conditions.

As mentioned, all possible combinations of the enumerated optional features of these materials and lithium-ion batteries incorporating such materials are specifically disclosed as embodiments. Also specifically disclosed are combinations including lithium-ion batteries having electroactive materials with surface coatings optionally with any one or any combination of more than one of the enumerated features (1)-(7).

The details, examples and preferences provided above in relation to any particular one or more of the stated aspects of the present invention, and described and exemplified below in relation to any particular one or more of the stated aspects of the present invention, apply equally to all aspects of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electroactive material for an electrochemical cell comprising:
   $Li_{(4+x)}Ti_5O_{12}$, where 0≤x≤3 (LTO); and
   a surface coating formed thereon via a non-aqueous atomic layer deposition (ALD) process, wherein the surface coating is selected from the group consisting of: a fluoride-based surface coating, a carbide-based surface coating, and a nitride-based surface coating and has a thickness of less than or equal to about 30 nm that suppresses formation of gases within the electrochemical cell.

2. The electroactive material of claim 1, wherein the surface coating is a fluoride-based surface coating formed from a precursor material selected from the group consisting of: lithium fluoride (LiF), aluminum fluoride (AlF$_3$), and combinations thereof.

3. The electroactive material of claim 1, wherein the surface coating is an oxyfluoride-based surface coating formed from a lithium fluoride (LiF) precursor material.

4. The electroactive material of claim 1, wherein the surface coating suppresses greater than or equal to about 99.5% of gases that would otherwise be generated by a comparative LTO material lacking the surface coating.

5. The electroactive material of claim 1, wherein the surface coating is a fluoride-based surface coating having a thickness of less than or equal to about 15 nm that suppresses substantially all formation of gases within the electrochemical cell for greater than or equal to about 3 years.

6. The electroactive material of claim 1, wherein the non-aqueous atomic layer deposition (ALD) process binds or consumes hydroxyl groups on the surface of the LTO.

7. The electroactive material of claim 1, wherein the surface coating is a fluoride-based surface coating having a thickness of less than or equal to about 4 nm.

8. A lithium-ion electrochemical cell comprising:
a negative electrode comprising a $Li_{(4+x)}Ti_5O_{12}$ material, where $0 \leq x \leq 3$ (LTO);
a positive electrode;
a separator; and
an electrolyte; wherein any LTO exposed to the electrolyte within the electrochemical cell has a protective surface coating formed by a non-aqueous atomic layer deposition (ALD) process with a thickness of less than or equal to about 30 nm to suppress formation of gas within the electrochemical cell, wherein the surface coating is selected from the group consisting of: a fluoride-based surface coating, a carbide-based surface coating, and a nitride-based surface coating and the surface coating suppresses gas formation in the lithium-ion electrochemical cell so that any gases generated correspond to less than or equal to about 0.1% of a sealed lithium-ion electrochemical cell volume when gas volume is evaluated at standard temperature and pressure (298 K, 1 atm) conditions.

9. The lithium-ion electrochemical cell of claim 8, wherein the protective surface coating is a fluoride-based surface coating formed from a precursor of a LiF coating.

10. The lithium-ion electrochemical cell of claim 8, wherein the protective surface coating is a fluoride-based surface coating, the positive electrode is a material selected from the group consisting of: lithium manganese oxide ($Li_{(1+x)}Mn_{(2-x)}O_4$), where $0 \leq x \leq 1$; lithium manganese nickel oxide ($LiMn_{(2-x)}Ni_xO_4$), where $0 \leq x \leq 1$; lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$; and combinations thereof.

11. An electroactive material for an electrochemical cell comprising:
$Li_{(4+x)}Ti_5O_{12}$, where $0 \leq x \leq 3$ (LTO); and
a surface coating formed thereon by a non-aqueous atomic layer deposition (ALD) process selected from the group consisting of: a fluoride-based surface coating, a carbide-based surface coating, and a nitride-based surface coating having a thickness of less than or equal to about 4 nm that suppresses formation of gases within the electrochemical cell.

12. The electroactive material of claim 11, wherein the non-aqueous atomic layer deposition (ALD) process binds or consumes hydroxyl groups on the surface of the LTO and the surface coating suppresses greater than or equal to about 99.5% of gases that would otherwise be generated by a comparative LTO material lacking the surface coating.

13. The electroactive material of claim 11, wherein the thickness of the surface coating is greater than or equal to about 0.5 nm to less than or equal to about 3 nm.

14. The electroactive material of claim 11, wherein the surface coating is a fluoride-based surface coating.

15. An electroactive material for an electrochemical cell comprising:
$Li_{(4+x)}Ti_5O_{12}$, where $0 \leq x \leq 3$ (LTO); and
a fluoride-based surface coating formed thereon via a non-aqueous atomic layer deposition (ALD) process having a thickness of less than or equal to about 30 nm that suppresses formation of gases within the electrochemical cell.

* * * * *